This invention relates to the storage of liquified petroleum gases and, more specifically, relates to the control of the composition of commercial liquified petroleum gas (LPG) stored under refrigeration at atmospheric pressure.

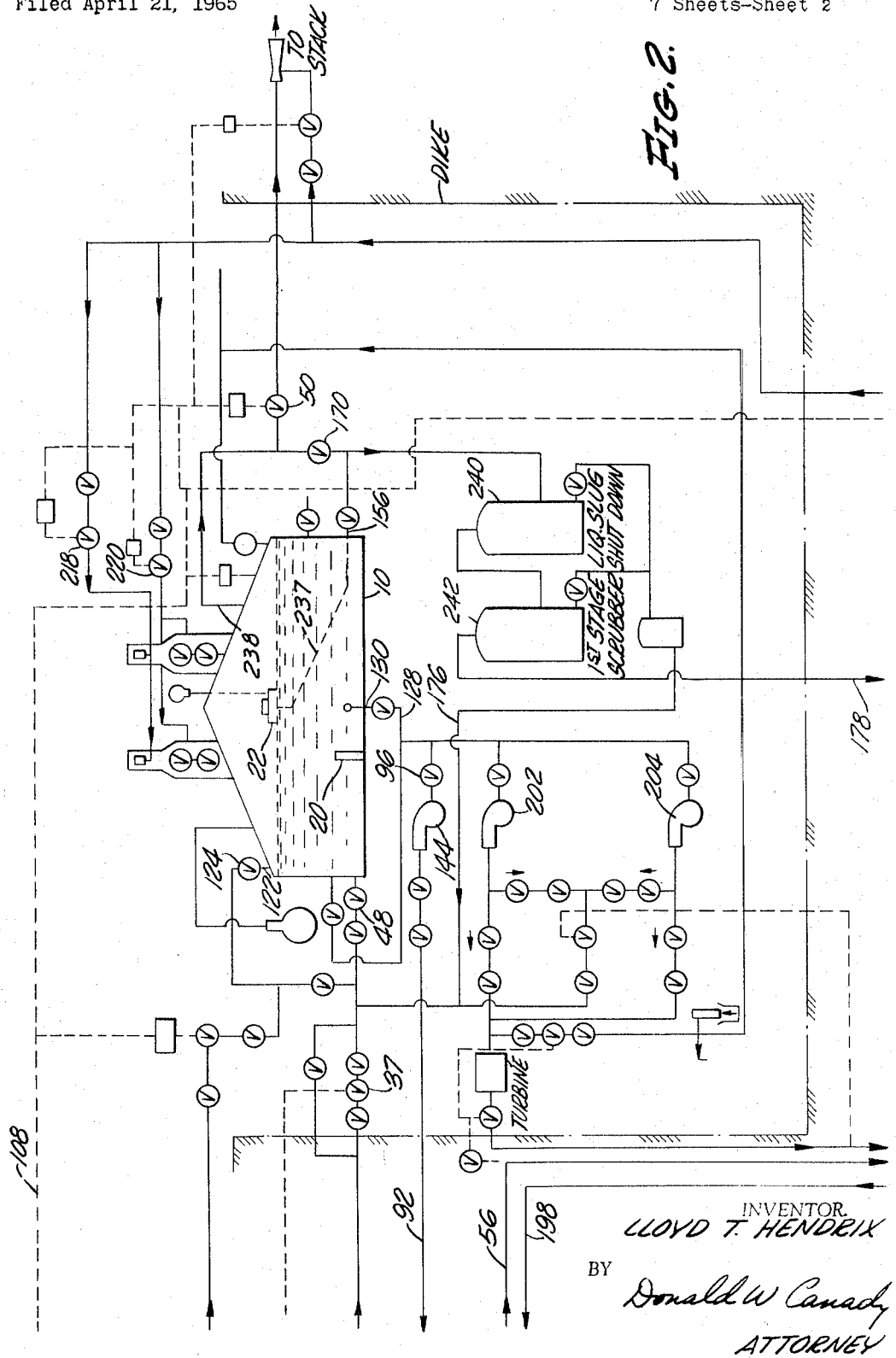

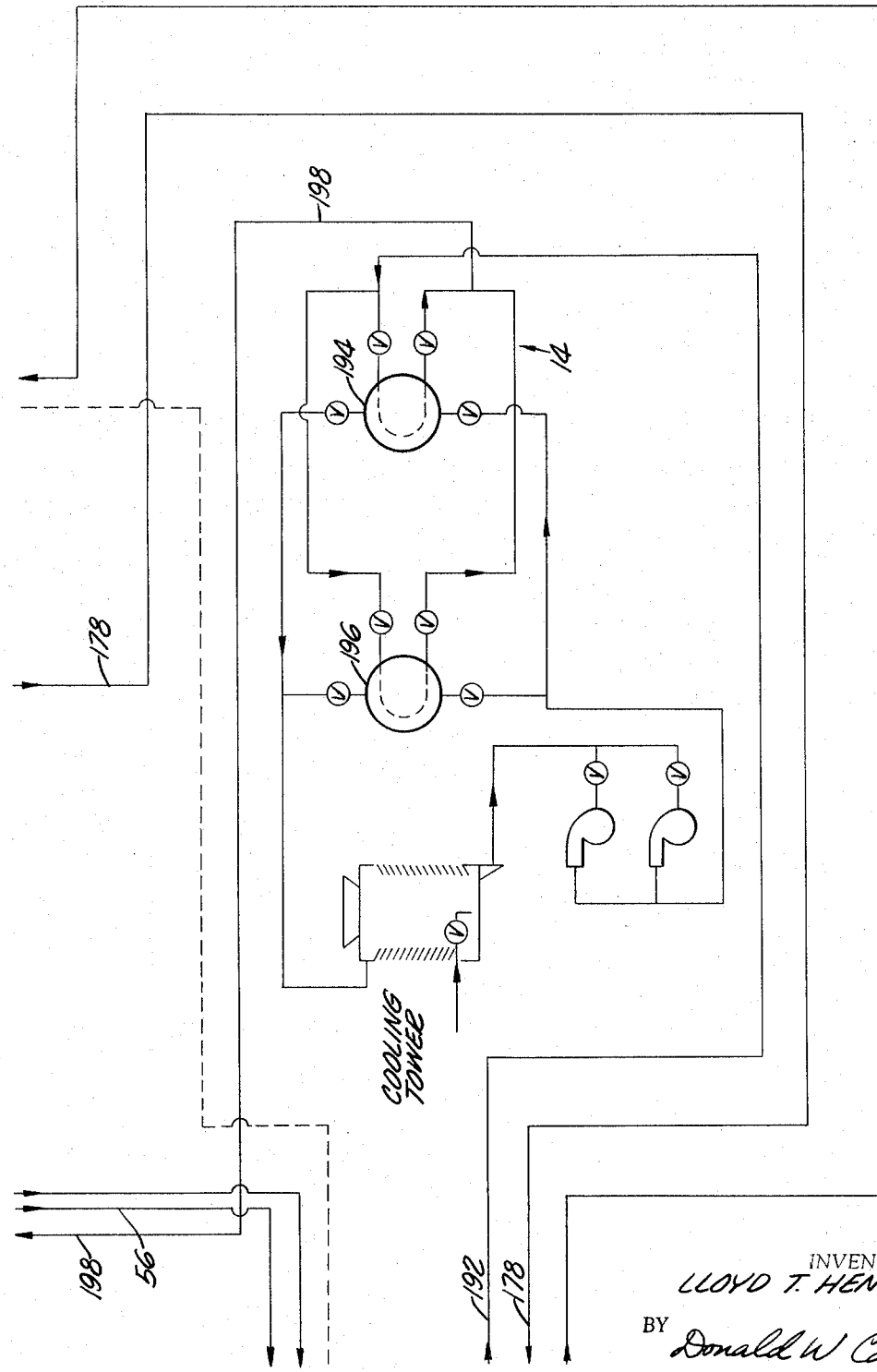

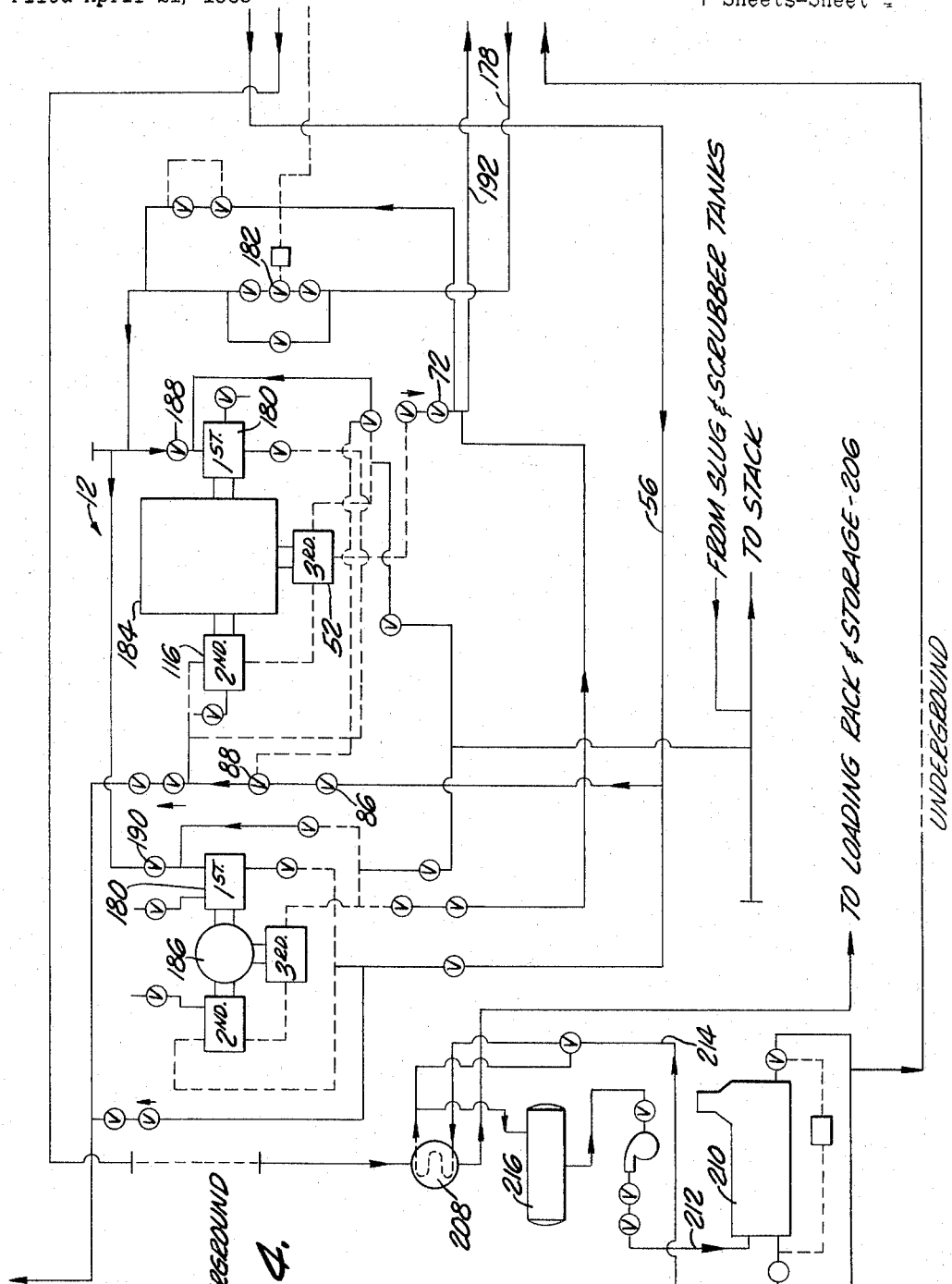

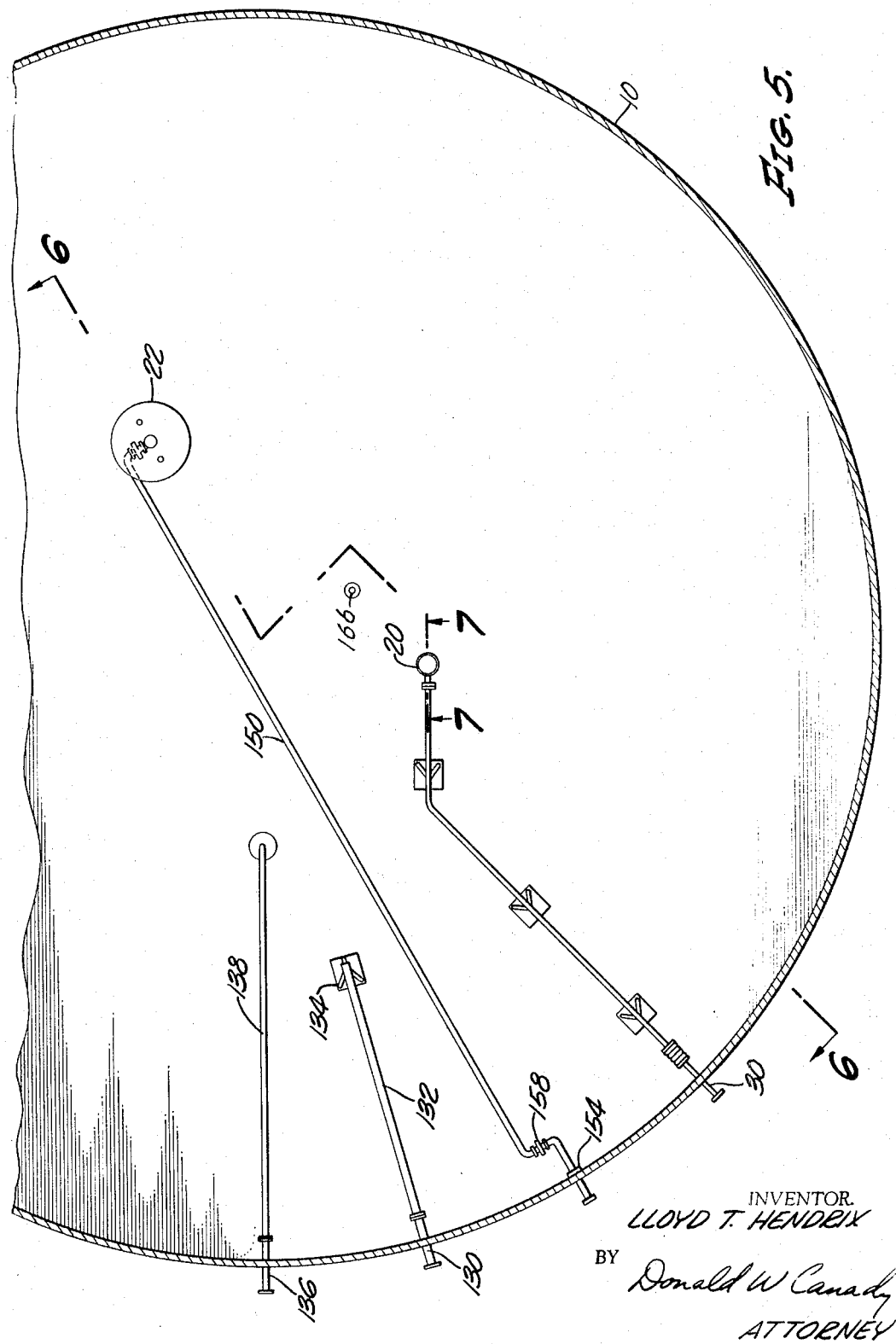

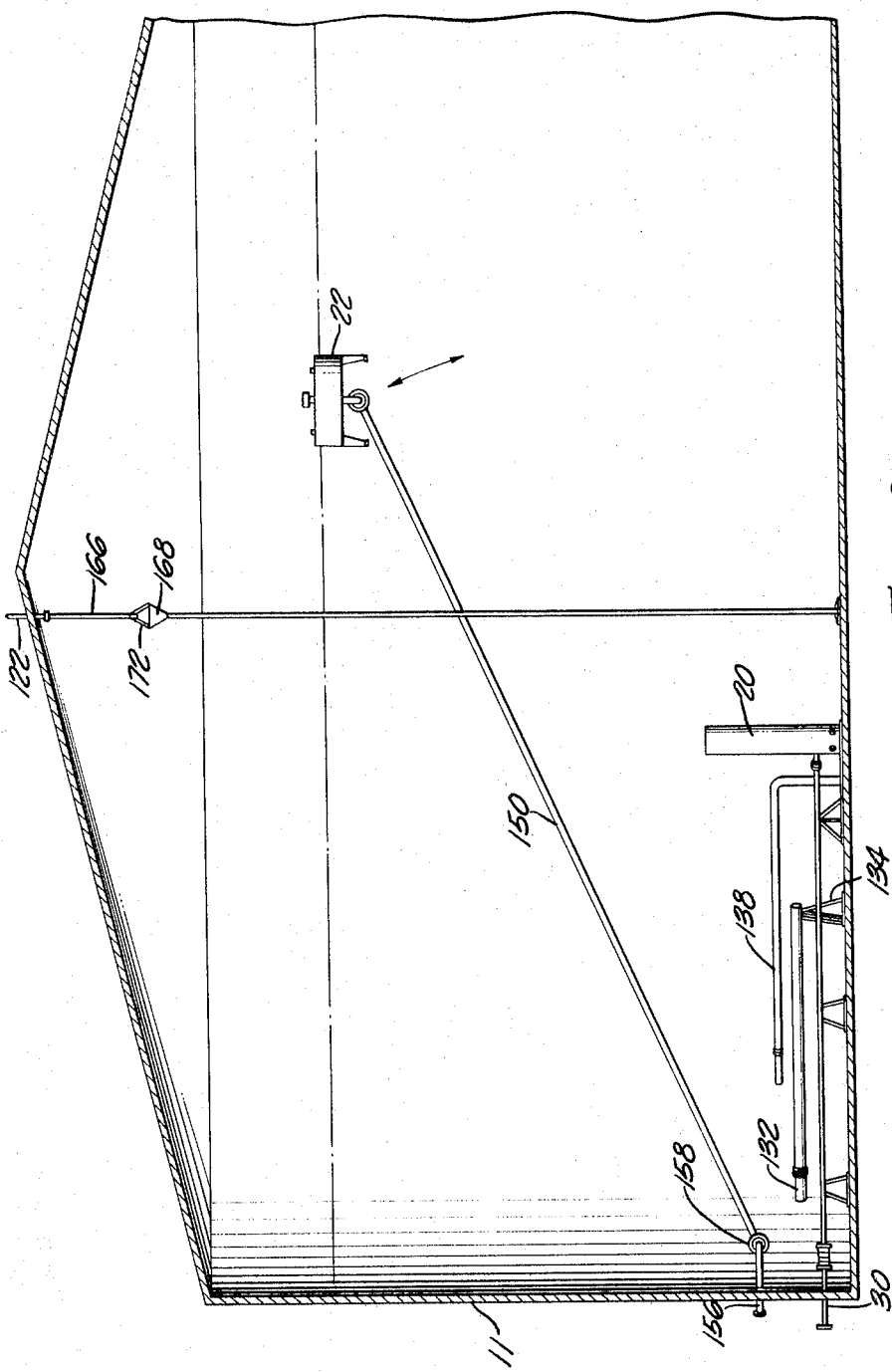

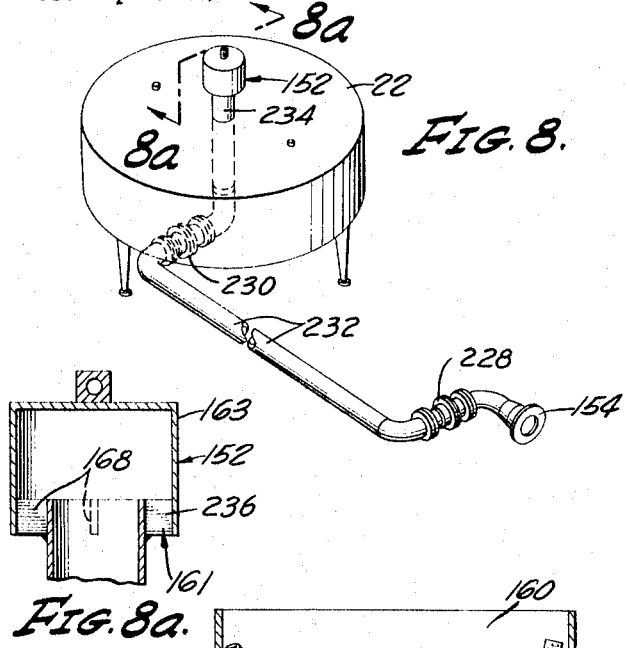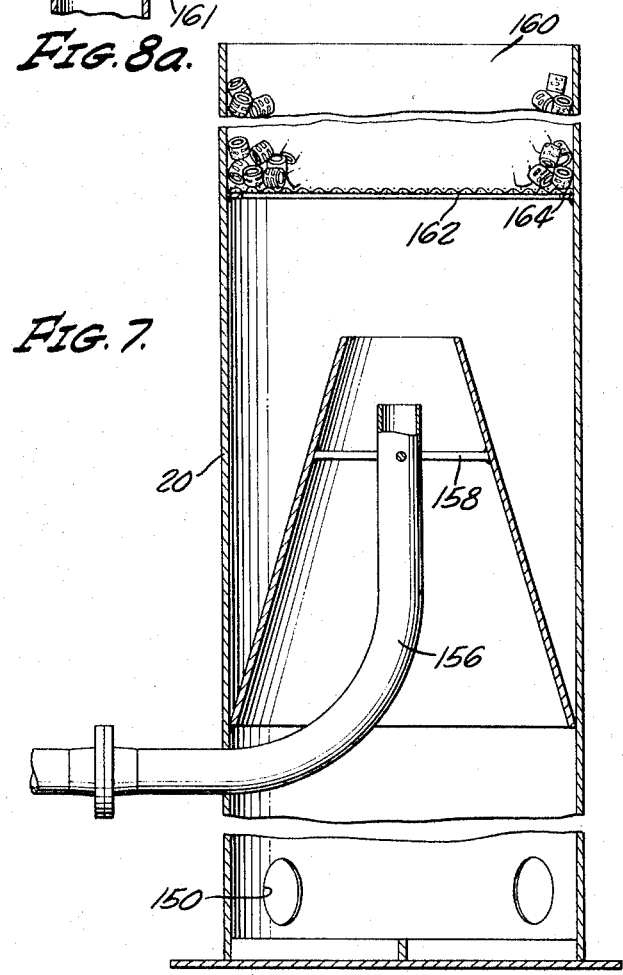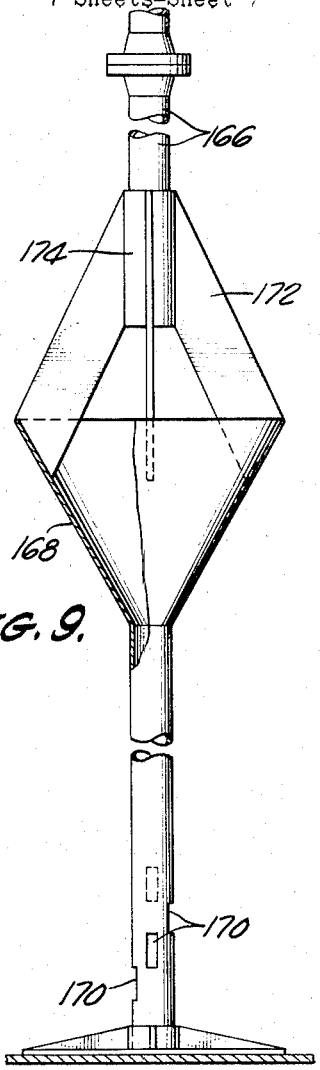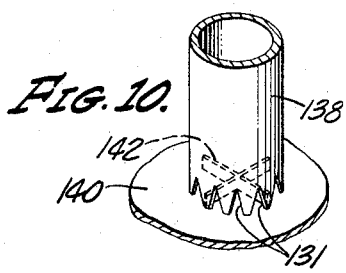
INVENTOR.
LLOYD T. HENDRIX
BY Donald W Canady
ATTORNEY 3,298,186
ATMOSPHERIC LPG STORAGE TANK AND
PROCESS
Lloyd T. Hendrix, Santa Ana, Calif., assignor to Richfield Oil Corporation, Los Angeles, Calif., a corporation of Delaware
Filed Apr. 21, 1965, Ser. No. 449,722
19 Claims. (Cl. 62—50)

In order to maintain volatile liquids such as LPG in the liquid state, they must be stored under sufficient pressure to contain the more volatile constituents at their vapor pressure at ambient temperature, or the liquids must be refrigerated in order to maintain their vapor pressure at a value near atmospheric pressure. Commercial propane produced in a gas plant usually contains several percent of ethane. In the storage of such propane containing, for example, about 5% ethane, because of the higher volatility of the ethane, the vapor above the propane in the storage tank contains a substantially higher percentage of ethane than the liquid in the storage tank. When the liquid is taken from the storage tank for sales, it is desirable to have about 5% ethane in the liquid so that the propane will have a higher vapor pressure to insure adequate fuel pressure, even in areas where ambient temperatures are well below zero. Also, the ethane content increases the volume of the propane available for sale and since ethane commands a higher price when sold as liquid with LPG than it does as gas, when sold as natural gas, it is desirable to maintain the ethane content of the propane liquid.

Refrigeration is the principal means for controlling the ethane content of stored LPG. In the prior art processes, the ethane level of the LPG was maintained by withdrawing from the tank the high ethane content vapors, compressing these vapors and subsequently condensing and returning a condensed high ethane liquid to the tank. Total condensation was often unattainable, and the high ethane content gases (the "noncondensibles") flared, or were recycled if a processing plant was nearby. The prior art processes also provide for flashing the condensate in a flash tank to reduce the pressure of the condensate to an intermediate point between fill line pressure and the pressure of the LPG storage tank. The vapors from the flash tank are combined with the compressor feed gases from the tank and recompressed with the high ethane vapors from the storage tank. The vapors from the flash tank, however, have a higher ethane content than the vapors removed from the storage tank and, consequently, increase the pressure required to permit condensation of said high ethane content vapors with ordinary plant cooling water, at about 80–100° F.

It is therefore an object of the present invention to provide a refrigeration method whereby the ethane content of the vapors from the flash tank is such that said vapors, when recycled with the vapors from the storage tank, may be condensed with ordinary plant cooling water at relatively low operating pressures.

It is a prime object of my present invention to provide an improved apparatus and method for maintaining the ethane content of a refrigerated propane liquid stored in a container by condensing a portion of the vapors from the container and returning the condensate to the container.

It is also an object of my present invention to provide cooling of the liquid propane stream returned from the flash tank to the storage tank in order to reduce the amount of ethane vaporized as the liquid propane stream is returned to the storage tank.

Liquid pumped from the storage tank through a meter is heated prior to transmittal to the truck loading rack or to pipeline transmission since the propane is stored in the tank at a temperature on the order of −50° F., or at least at temperatures lower than the temperatures at which liquids can be conveniently transported. According to the prior art practices, a direct fired heater is utilized to heat the liquid propane to loading temperatures and, thus, when the liquid propane loading demand is met and the loading valve is shut off, the remaining propane in the heated system and loading line from the storage tank vaporizes. It has heretofore been the practice to provide a relief valve or other handling means to remove the liquid propane from the high temperature area after a shutdown of the loading pump.

Accordingly, it is another object of my present invention to provide a means for heating liquid propane for loading which does not require relief valves or other means for removing the propane from the high temperature area after the loading pump is shut off in order to prevent vaporization of propane.

The storage tank of my present invention is designed for operation at atmospheric pressure and should the pressure within the tank exceed about one-half pound above atmospheric pressure, as could be caused, for example, by a compressor failure, damage to the tank could result. It is therefore desirable to provide a means for removing vapors from the storage tank if the pressure exceeds a certain value. Propane vapors, however, being heavier than air, could settle to ground level and drift to a source of ignition.

Accordingly, it is a further object of my present invention to provide a means for removing vapors from an LPG storage tank in the event that such removal is desirable, so that the vapors are diluted and dispersed into the atmosphere without creating a fire or explosion hazard.

The vapors over the liquid in the storage tank are colder adjacent the liquid than the vapors adjacent the top of the storage tank. Consequently, it is desirable in removing high ethane content vapors from the storage tank for compression and returning to the tank, to remove relatively cold vapors from a point near the liquid level, thereby circulating relatively cold vapors to the compressor and thus reducing the compressor power requirements.

Accordingly, it is an object of the present invention to provide means for removing vapors from an LPG storage tank whereby the power requirements for compressing said vapors are minimized.

There is a tendency towards temperature stratification in the liquid contained in the storage tank. This temperature stratification results in a higher temperature just below the surface of the liquid. Thus, when the warmer liquid begins to rise, the decrease in pressure causes large quantities of vapor to be released, which could result in compressor overloading or tank overpressure. Accordingly, it is desirable to return the liquid propane condensate from the flash tank in such a manner that the condensate is mixed with the liquid in the tank and the tendency toward temperature stratification reduced.

It is therefore a further object of my present invention to provide liquid return means in the storage tank which facilitates mixing of the return liquid with the liquid in the tank to reduce the tendency toward temperature stratification within the tank.

Other objects and a more complete understanding of my invention may be had by reference to the following specification and the appended claims, when taken in conjunction with the drawings, wherein:

FIGS. 1–4 show the LPG storage tank schematically and a flow diagram of the processing associated with said tank with FIGS. 1–4 assembled quadrantially, FIG. 1 being the upper left quadrant, FIG. 2 being the upper right quadrant, FIG. 3 the lower right quadrant, and FIG. 4 the lower left quadrant;

FIG. 4 is a partial plan view of the LPG storage tank showing the relative positions of the inlets and outlets of the tank;

FIG. 6 is an elevational view of the storage tank taken on line 6—6 of FIG. 5;

FIG. 7 is an elevation partially in cross section of the inlet fill column taken on line 7—7 of FIG. 5;

FIG. 8 is an isometric view of the suction float and vapor outlet line;

FIG. 8a is an enlarged view of the intake cap on the suction float of FIG. 8 taken on line 8a—8a;

FIG. 9 is an elevational view partially in section of the top inlet shown in FIG. 6;

FIG. 10 shows the drain line end which contacts the bottom of the tank.

Figure 1:
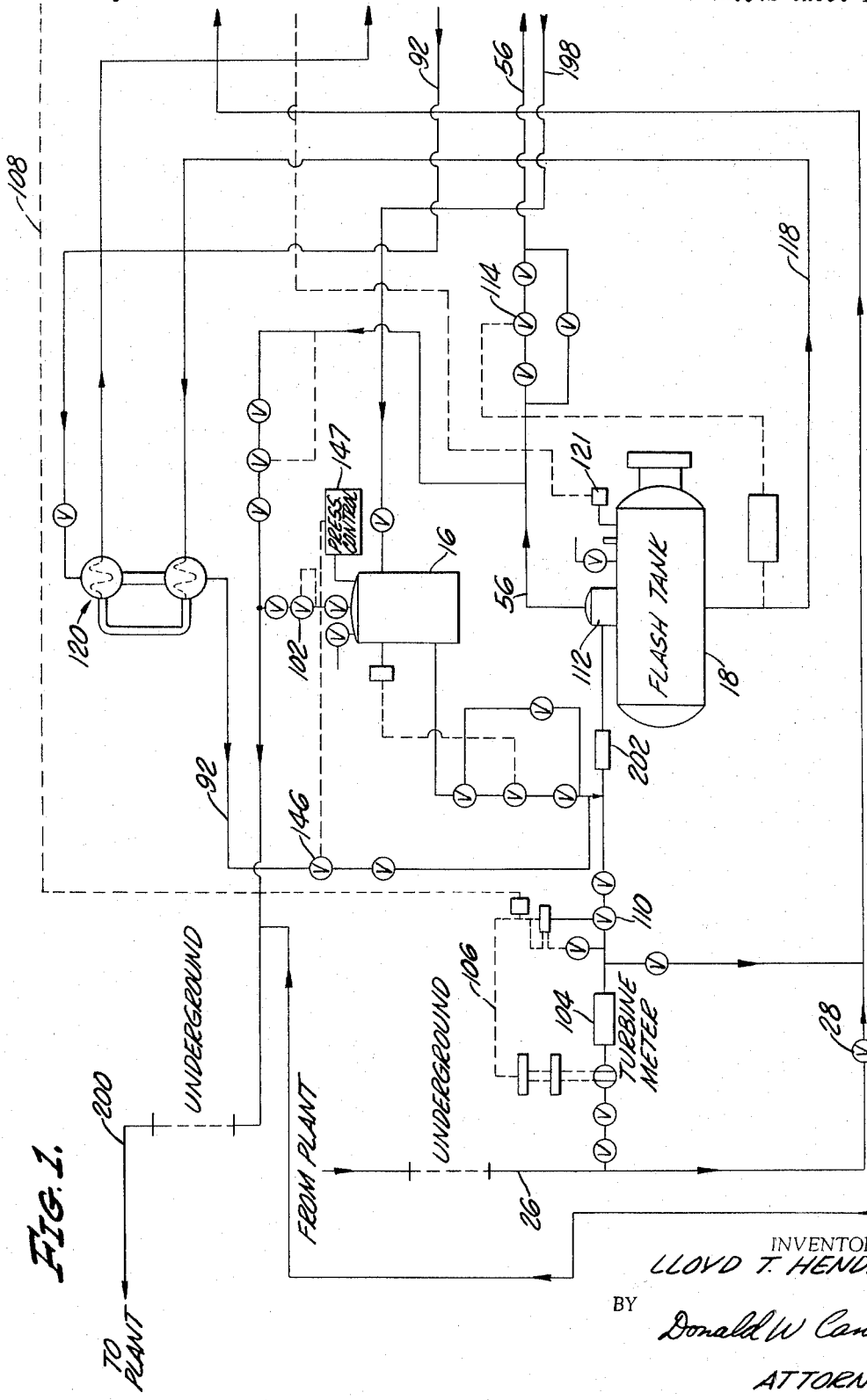

My present process involves a process for maintaining the ethane content in a propane liquid solution at a level of between 1 and 10% by withdrawing cold vapors from over the liquid in the storage tank 11 and compressing these vapors in a multi-stage compressor unit 12 after which the compressed vapors are condensed in a water cooled condensor unit 14, and condensed liquid flows into an accumulator vessel 16. The propane-ethane condensate in the accumulator is withdrawn and commingled with liquid recycled from the storage tank 11 and with propane from a production plant (not shown) when the storage tank is being filled, and the commingled mixture flashed to a relatively low pressure, e.g., 35–50 p.s.i., and the flashed liquid and vapors collected in a flash tank 18. The liquid from the flash tank is heat exchanged with the commingled liquid drawn off from the storage tank and then passed into the storage tank to maintain the ethane content in the storage tank. The vapors from the flash tank are returned to the second stage of the compressor system 12 where they are recompressed and condensed with the vapors drawn off from the storage tank.

The apparatus used with the present invention includes, briefly, a novel inlet fill column 20, as shown in FIG. 7, which is designed to prevent temperature stratification within the liquid in the tank and a suction float 22, as shown in FIG. 8, which floats on the top of the propane liquid in the tank 11 and through which cold vapors are withdrawn from the tank to be compressed and condensed.

The utility of my process and apparatus can best be illustrated by the following description of a typical embodiment of my process.

Before the storage tank 11 is filled with propane from the propane production plant (not shown) through line 26, the system is purged with an inert gas such as nitrogen by conventional purging techniques, through a temporary purge gas connection valve 28.

When the purging operation has been completed, liquid propane is introduced into the system through line 26 from a propane plant, as previously mentioned. With the valve 28 closed, the liquid propane is metered through a turbine meter 104 at about 35 gal./min. initial fill rate which is controlled by the main flow recorder controller designated generally as 106. The controller system 106 acts as a back pressure regulator and a shutdown device. The shutdown device is actuated by high tank pressure through a pressure pilot through line 108.

The liquid propane being introduced into the storage tank 11 flashes at the FRC-BPR-SCV valve 110 and the flashed liquid and vapors then flow into the flash tank 18 which is preferably a 50 pound flash tank. This vessel 18 allows the liquid-gas separation to take place. The gas or vapors pass through a york mesh section 112 and out through back pressure valve 114 to the compressor unit 12 second-stage intake 116.

The liquid from the flash tank 18 flows through line 118 and through heat exchanger 120 to the liquid level control valve 37. This valve 37 maintains the liquid level in the flash tank 18 and is actuated by the liquid level control 121. After the propane flashes across the liquid level control valve 37 to near atmospheric pressure, it normally enters the tank at the bottom through valve 48. There is also provided a top fill line 122 through which propane may be introduced into the tank by opening valve 124 on the tank top.

It has been found desirable according to my present invention, to commingle a recycled stream from the propane storage tank, with the compression condensate and, if the storage tank is being filled from the propane plant, liquid from the propane plant, before introducing said streams into the flash tank 18. The commingled stream is recycled from the propane storage tank 11 through a drain line 128 which is connected, as best shown in FIG. 5, through the side of the tank at 130 to a drain pipe 132, the end of which is supported on a tripod stand 134. When the liquid level in the tank is low, that is, less than about two to three feet of liquid, the commingled stream is removed from the tank through line 136 which is connected to a drain inlet 138, as best shown in FIG. 10. The end of the drain in the pipe 138 is notched at the bottom and curved 90° so that the pipe sits flush on the bottom of the tank on a steel base 140. The lower end of the pipe is equipped with a vortex breaker which comprises a flat steel bar 142 cross welded to the inside of the pipe flush with the bottom of the notches 131.

A commingle pump 144 takes suction from the tank 10 and pumps cold propane liquid through the commingle exchanger 120 exchanging heat with the liquid stream pumped from the flash tank through line 118 to the storage tank 11. After passing through the exchanger 120, the commingled stream flows with the main propane feed to the flash tank 18. During normal operations when the storage tank 11 has been filled, the feed into the flash tank comprises about 75 gal./min. of recycle from the storage tank through line 92 and approximately 110 gal./min. of condensate from the accumulator 16. When the tank is filling, about 25–30 gal./min. propane is pumped in from the propane production plant. The commingled recycle stream is controlled by the pressure control valve 146 which is actuated by a pressure controller 147 on the compressor discharge accumulator. This commingle serves to prevent the ethane concentration in the compressor discharge from becoming so high that it cannot be condensed at normal operating pressures (up to about 350 p.s.i.) with ordinary plant cooling water, by introducing into the accumulator liquid discharge a cold, low ethane content propane stream.

The purpose of the commingle is twofold. The use of commingle into the flash tank reduces the ethane content of the vapors removed from the flash tank through line 56 so that they can be compressed at normal operating pressures with cooling water at about 80–100° F. Secondly, the commingle permits absorption of more ethane in a liquid being returned to the tank by increasing the L/V ratio.

In order to absorb ethane from the vapors in the flash tank, it is desirable to use as a commingle fluid a relatively low ethane material so that some of the ethane from the vapors in the flash tank can be absorbed in the commingle liquid.

Another purpose of the commingle system is to provide additional refrigeration of the propane stream from the flash tank (by heat exchange with a commingle liquid from the tank) in order to hold the ethane in solution in the liquid propane from the flash tank as it passes into the storage tank. Thus, the liquid from the flash tank is returned to the storage tank through line 113 and heat exchanged with the cold liquid recycled from the storage tank for commingle. The amount of liquid from the flash tank returned to the storage tank 10 is controlled by the liquid level in the flash tank 18 through liquid level control valve 37.

The return liquid enters the storage tank through pipe 30 and up through the inlet fill column 20, as shown schematically in FIG. 5 and as shown in elevation in FIG. 7. With reference to FIG. 7, a fill column designed to minimize temperature stratification within the liquid of the storage tank is illustrated. Liquid from the tank is educted into the column through the circumferentially spaced holes 150 up through the conical section 152 and through the nozzle 154, by the passage of the vapor-liquid mixture from the flash tank through the jet pipe 156 at a pressure somewhat higher than the pressure prevailing in the tank. Jet pipe 156 receives flow from fill pipe 30 and is fixed within the conical section 152 with a spider brace 158. As the liquid from the tank is educted up through holes 150 and the nozzle 154, it is mixed with the vapor-liquid mixture from the flash tank thus reducing the tendency towards temperature stratification within the tank by mixing the liquid in the tank and intimately mixing the warmer fill liquid coming into the tank with the colder liquid in the tank. Further mixing is accomplished as the liquid passes up through the inlet column 20 by allowing the mixture to pass through pall rings in section 160. Pall rings are supported on an expanded metal support 162 which is supported within the column on a welded ring 164.

If the inlet column 20 should become plugged, the vapor-liquid mixture from the flash tank enters the storage tank 10 through the top fill connection 122 through pipe 166 and funnel 168 (FIG. 9), by opening valve 124 located on the tank top. The top fill connection 122 is shown diagrammatically in FIG. 2, but for convenience of illustration is shown closer to the side of tank 11 than its actual position which is shown in FIGS. 5 and 6. As shown in FIGS. 6 and 9, the top or roof inlet 122 comprises a pipe 166 which feeds the liquid and vapor mixture into a funnel 168 on top of a pipe which extends to the bottom of the tank and has circumferentially spaced slots 170 below the liquid level through which the incoming liquid can pass into the tank. The funnel is supported within the tank by a spider member 172 which is connected to the overhead pipe 166 through a sleeve 174 therein. When filling through the roof, the inlet flow will normally be through the lower pipe slots 170; however, if the feed rate increases sufficiently, the top of the funnel 168 is open so that overflow can spill over the top of the funnel and into the tank rather than back up into the inlet pipe 166.

Vapors are removed from the storage tank 10 through a floating suction line 232 which is swivelly attached to float 22 so that as the liquid level in the tank 11 rises or drops the vapor intake vent 152 will be approximately the same distance above the top of the liquid level in the tank. The flanged end 154 of the suction line is connected to a pipe outlet 156 in the tank, as best shown in FIG. 5, and is provided with a swivel or ball joint 228 so that the suction line 232 pivots about the connector pipe 156 as the suction line moves up and down with the liquid level in the tank 11. The float end of the suction line 150 is connected through a second swivel joint 230 to a vent pipe 234 which extends through the float and is vented at the upper end above the float to pull vapors in through the vent pipe and the suction line 232. The top of the vent pipe 234 is capped with vent top 163 which is secured to the pipe with four gussets 236. The vapors entering the vent pipe thus pass under the vent top and into the top of the vent pipe, as shown by the arrows in FIG. 8a.

If the suction line 232 should become plugged, vapors are removed from the top of the tank 11 through pipe 238 which, when valve 50 is opened, can vent gases to the stack. When the line 238 is used as an alternate means for removing vapors from recompression, the valve 50 is closed and valve 170 open.

Vapors removed from the tank through the suction line are passed through a liquid slug remover 240 and a scrubber 242 to remove liquids therefrom which may be may be entrained with the vapors if tse flexible joints 228 and 230 leak liquid into the vapor line. The liquid from the scrubber 242 and the liquid slug shutdown tank 240 are returned to the storage tank 11 by means of a blow case through line 176. The scrubbed vapors are then passed through line 178 to the compressor unit 12 entering the first stage of compressor 180. Both the liquid slug shutdown vessel 172 and the first stage scrubber 174 are provided with shutdown devices to kill the compressors should liquid pass into the system. The pressure control valve 182 opens to increase the compressor loading to the first stage 180 as the tank pressure increases. The pressure control valve 182 is actuated by tank pressure acting on a pressure pilot at the main control panel. Thus, the valve 182 controls the pressure in the storage tank 11.

Regarding the compressor unit 12, both a natural gas engine driven compressor 184 and an electrically driven compressor 186 are provided so that in case of failure of one, continuous service will be assured. Valves 188 and 190 control the vapor inlet to the two compressor units, and one of these valves is always closed. Considering that the natural gas driven compressor 184 is the compressor in service, vapors from the tank enter the first stage of compression past valve 188 and are compressed successively through the second stage 116 and third stage 52 and then pass through line 192 to the condensers 14. In the compressor unit the vapors are compressed in the first stage to about 50 p.s.i., in the second stage to about 120 p.s.i., and in the third stage to about 300 p.s.i. where the heat of compression raises the temperature to about 200° F. The compressed gases are then condensed in the condenser unit 14 by cooling with ordinary plant cooling water at a temperature of about 80–100° F. in one of two parallel condenser units 194 or 196 and the compression condensate passed into an accumulator vessel 16 through line 198. The vapor pressure of the liquid material in the accumulator 16 varies with the ethane content. At higher ethane contents it is desirable to recycle more commingle. Consequently, a pressure control valve 146 is actuated by the pressure on the accumulator vessel 16. A back pressure valve 102 is provided on the accumulatro 16 to permit withdrawal of vapors from the accumulator which are fed through line 200 to the propane plant (not shown).

The compression condensate in the accumulator vessel 16 is commingled, as aforesaid, with the propane from the production plant through line 26 and cold liquid recycle from the storage tank 11 through line 92. The commingled mixture is then flashed and collected in the flash tank 18. Intermingling of the two or three commingle streams is effected in the flow nozzles 202 prior to entry of the commingled liquid in the tank 18. The vapors from the flash tank which is under a pressure of about 35–50 p.s.i., are returned through line 56 to the second stage of compression where they are joined with the vapors from the storage tank discharged from the first stage of compression. The liquid from the flash tank 18 is returned to the storage tank 11, as previously mentioned, through line 118.

The shipping pumps 202 and 204 take suction from the tank 11 through drain line 128 and, with the commingle valve 96 closed, pump liquid to the shipping area 206 for shipment by tank or pipeline, etc. Since the liquid in the tank is below −50° F., it is desirable to heat the liquid propane prior to shipment, to about 40° F. This heating is preferably accomplished by heating in heat exchanger 208 where it exchanges heat with a heat transfer fluid which is heated in a fired heater 210. The heat transfer fluid is pumped through the fired heater through line 212 and thence through the heat exchanger through line 214 and returned through a surge tank 216. Propane is heated in the relatively large volume shell side of the exchanger 208 by a relatively small amount of heat medium fluid. Thus, when the pumps are shut off, the residual heat in the fluid is not enough to raise the propane temperature to its vaporization point and no vapor relief valves or automatic cycling arrangement to cool the heater are necessary.

The desired pressure in the storage tank 11 is between 0.1 and 0.2 p.s.i.g. When the pressure is below this in the range of 0.0 to 0.1 p.s.i.g., warm propane is injected into the tank through the top. When the pressure rises above 0.2 p.s.i.g., that is, in the range of 0.22 to 0.35 p.s.i.g., both compressors 184 and 186 are run simultaneously and the fill valve 48 is throttled. When the tank pressure rises to between .38 and .48 p.s.i.g., pressure control valve 50 is opened to release vapors from the tank to the stack. When the pressure rises above 0.5 p.s.i.g., pressure control valves 218 and 220 open to admit the eductor gas to remove vapor from the tank.

The following specific example further illustrates one embodiment of my invention, although my invention is not limited thereto:

Propane from a gas plant containing 95% propane and 5% ethane at 220 p.s.i. and 80° F. was introduced into the flash tank 18 through line 26, the propane flashed, and the vapors and liquid separated in the flash tank with the liquid being introduced into the storage tank 11. Vapors containing 26% ethane and 74% propane were taken from the tank at −55° F. and atmospheric pressure through the suction line 150 from the float intake and passed through the liquid slug shutdown 172 and scrubber 174 and then introduced into the first stage of the compressor 12. The vapors were compressed in the first stage to 50 p.s.i., and in the second and third stages to 300 p.s.i. with the temperature rising to 200° F. The composition of the compressed vapors leaving the third stage was 28–32% ethane, the ethane composition increasing slightly due to high ethane vapors recycled from the flash tank, as will be hereinafter mentioned. The compressed vapors were then condensed in the parallel condensing unit 14 at 300 p.s.i. with cooling water at 80° F. and the condensed liquid at about 100° F. introduced into the accumulator vessel 16. The liquid from the accumulator 16 was then commingled with the propane from the production plant, as required by the pressure control on the accumulator which indicates the ethane content of the propane in the accumulator, thus automatically indicating the need for commingle to reduce the ethane content of the capors from the flash tank so that they can be condensed with ordinary plant cooling water at normal operating pressures. When the liquid level in the tank reached four feet, the pump 144 was started and cold liquid from the tank was pumped through line 92 to commingle with the propane from the production plant and the liquid from the accumulator. The liquid from the flash tank introduced into the storage tank 11 was heat exchanged with the cold liquid recycle from the tank in order to reduce the temperature of the liquid from the flash tank to about −30° F. before it was introduced into the storage tank. After the tank 11 was full, the approximate relative proportions of commingle from the storage tank, propane from the production plant, and liquid from the accumulator were: 75 gal./min. of commingle from the storage tank; 0 gal./min. propane from the production plant; and approximately 85 gal./min. of liquid from the accumulator.

The liquid from the flash tank contained between 12–15% ethane at 0° F. and 35–50 p.s.i. The flash tank was operated at about 50 p.s.i. in order to save horsepower by avoiding the necessity for compressing the vapors from the flash tank through the first stage of compression. The vapors from the flash tank contained approximately 30% ethane at 0° F. and 35–50 p.s.i. and were recycled to the second stage 116 of the compressor unit 12. With this arrangement the ethane content of the propane in the storage tank 11 was maintained at a 5% level.

Reference has been made to a system for holding ethane in a propane liquid; however, the present system may also be used for holding other volatile constituents in a less volatile liquid material such as, for example, holding methane in an ethane storage tank.

Although my present invention has been described with a certain degree of particularity, the scope of the invention is not limited to the details set forth, but is of the full breadth of the appended claims.

I claim:

1. In a method for maintaining a first volatile constituent in liquid solution in a second constituent of lesser volatility in a container, the steps comprising:
   removing vapors of said constituents from said container,
   compressing said vapors,
   condensing said compressed vapors to a liquid stream comprising a solution of said constituents relatively high in said first constituent,
   commingling said condensate with a second liquid stream comprising a solution of said constituents relatively low in said first constituent,
   flashing said commingled streams,
   collecting the flashed liquid and vapors in a vessel,
   returning the liquid from said vessel to said container to increase the concentration of said first constituent in said liquid solution in said container, and
   recycling the flashed vapors from said vessel to said vapors removed from said container.

2. The method of claim 1 wherein said compressed vapors are condensed at a pressure of between 50 and 350 p.s.i.

3. The method of claim 1 wherein said first volatile constituent is ethane and said second constituent is propane.

4. The method of claim 1 wherein said condensate is commingled with a liquid stream recycled from said container.

5. The method of claim 1 wherein said condensate is commingled with a liquid stream from a production plant.

6. In a method for maintaining a first volatile constituent in liquid solution in a second constituent of lesser volatility in a container, the steps comprising:
   removing vapors of said constituents from said container,
   compressing said vapors,
   condensing said compressed vapors to a liquid stream which comprises a solution of said constituents relatively high in said first constituent at about 80 to 100° F. at a pressure under about 350 p.s.i.
   commingling said condensate with a second liquid stream comprising a solution of said constituents relatively low in said first constituent,
   flashing said commingled streams,
   collecting the flashed liquid and vapors in a vessel,
   returning the liquid from said vessel to said container to increase the concentration of said first constituent in said liquid solution in said container, and
   recycling the flashed vapors from said vessel to said vapors removed from said container.

7. In a system for holding ethane in a liquid propane solution in a container with a vapor space over said solution at approximately atmospheric pressure, the combination comprising:
   a compressor,
   means for removing vapors from said space,
   means for passing said vapors from said space to said compressor,
   a condenser having means for condensing a compressed vapor stream, means for passing the compressed vapors discharged from said compressor to said condenser, an accumulator vessel operatively connected to said condenser to receive condensate therefrom, means for commingling a liquid stream recycled from said container with a stream of condensate withdrawn from said accumulator, means for flashing said commingled stream, a vapor-liquid equilibrium vessel for receiving the flashed commingled liquid and vapors flashed therefrom, means for passing said commingled mixture into said vessel, means for passing the liquid from said vessel to said container, and means for passing the vapors from said vessel to said condenser.

8. The system of claim 7 including means for passing said liquid from said vessel to said container in heat exchange relationship with said liquid stream recycled from said container as a commingled stream.

9. The system of claim 7 including means for operating said condenser with cooling tower water.

10. A liquid feed column for introducing liquid from a feed line into a liquid filled container, comprising in combination:

a hollow cylindrical column, a hollow frustum member arranged in said column with the smaller diameter of said frustum positioned upwardly, means for directing said liquid from said feed line through said column at a point below said frustum member and upwardly toward said smaller diameter, and an opening in said column below said frustum member through which liquid from said tank may be induced.

11. The apparatus of claim 10 wherein said frustum member is coaxial with said column.

12. The apparatus of claim 10 including means above said smaller diameter of said frustum member for intimately mixing said induced liquid and said feed liquid.

13. A vapor recovery device for removing vapors from the vapor space over a liquid in a container so that the vapors can be condensed and returned to said container, comprising:

a float member, a permanently open vent pipe positioned on top of said float member, a flow line operatively connecting said vent with the exterior of said container at a point proximate the bottom of said container, and means extending through said float for connecting said line with said vent.

14. The apparatus of claim 13 including swivel means in said last means to permit change in the vertical position of said float as the liquid level in said container changes.

15. In a method for maintaining a first volatile constituent in liquid solution in a second constituent of lesser volatility in a container, the steps comprising:

removing vapors of said constituents from said container, compressing said vapors, condensing said compressed vapors to a liquid stream comprising a solution of said constituents relatively high in said first constituent, commingling said condensate with a second liquid stream comprising a solution of said constituents relatively low in said first constituent, flashing said commingled streams, collecting the flashed liquid and vapors in a vessel, and returning the liquid from said vessel to said container to increase the concentration of said first constituent in said liquid solution in said container.

16. The method of claim 1 wherein said compressed vapors are condensed with cooling tower water.

17. The system of claim 7 including means for withdrawing said liquid from said container, and means for heating said withdrawn liquid indirectly with a relatively small amount of heat exchange fluid.

18. The apparatus of claim 13 including means for condensing said vapors, and means for returning said condensed vapors to said container.

19. A method for holding ethane in a liquid propane solution in a container with a vapor space over said solution, comprising the steps of:

removing vapors from the vapor space over said liquid through a conduit extending from said vapor space through said liquid to a point proximate the bottom of said container to effect a cooling of said vapors, condensing said removed vapors, and returning said cooled vapors to said container.

References Cited by the Examiner

UNITED STATES PATENTS

| | | | |
|---|---|---|---|
| 2,178,477 | 10/1939 | Johnson | 137—578 |
| 2,406,540 | 8/1946 | Harrington | 62—54 X |
| 2,959,928 | 11/1960 | Maker | 62—54 |
| 2,966,040 | 12/1960 | Henry | 62—54 |
| 3,123,249 | 3/1964 | Gorand et al. | 137—587 X |
| 3,150,495 | 9/1964 | Reed | 62—54 |

LLOYD L. KING, *Primary Examiner.*